United States Patent [19]

Davis

[11] Patent Number: 4,634,021
[45] Date of Patent: Jan. 6, 1987

[54] RELEASE MECHANISM
[76] Inventor: John W. Davis, 114 Laurel Haven Rd., Fairview, N.C. 28730
[21] Appl. No.: 749,277
[22] Filed: Jun. 27, 1985
[51] Int. Cl.⁴ .............................................. G07F 11/00
[52] U.S. Cl. ........................................ 221/3; 221/289; 221/312 C; 222/54; 272/8 R; 272/8 N; 446/475
[58] Field of Search ............... 116/221; 446/385, 475; 272/8 R, 8 N; 221/3, 9, 12, 13, 289, 312 C; 222/54, 39

[56] References Cited
U.S. PATENT DOCUMENTS
3,382,725 5/1968 Goldstein ............................ 74/1 R
3,584,763 6/1971 Donselman ........................... 222/54
3,968,900 7/1976 Stambuk ................................ 221/3

Primary Examiner—Joseph J. Rolla
Assistant Examiner—David H. Bollinger
Attorney, Agent, or Firm—Antonelli, Terry & Wands

[57] ABSTRACT

A release mechanism is disclosed for releasing an object such as a ball from a body under the force of gravity. A bimetallic element obstructs or opens an opening in the body for retaining or releasing the object depending upon the temperature of the bimetallic element. The release mechanism may be incorporated into a novelty "brass monkey" for "emasculating" the monkey when the temperature decreases to a predetermined temperature at which the balls in the "brass monkey" are permitted to drop to a base which is designed to produce an audible sound when struck by the balls.

20 Claims, 3 Drawing Figures

RELEASE MECHANISM

SUMMARY OF THE INVENTION

The present invention is directed to a release mechanism for releasing an object when the temperature reaches a predetermined release temperature. The release mechanism may be incorporated into a novelty "brass monkey" to "emasculate" the monkey when exposed to a predetermined temperature.

The release mechanism of the invention comprises means defining a passageway for movement of an object to be released and temperature responsive means at least partially obstructing the passageway to prevent movement of the object along the passageway before the temperature of the temperature responsive means reaches a predetermined release temperature. The temperature responsive means moves to open the passageway to allow movement of the object along the passageway when the temperature of the temperature responsive means reaches the predetermined release temperature. In a disclosed, preferred form of the invention the temperature responsive means is a bimetallic strip which is fixedly supported at one end with the opposite free end of the bimetallic strip being positioned for movement toward and away from the passageway for at least partially obstructing the passageway to prevent movement of the object along the passageway before the temperature of the bimetallic strip reaches the predetermined release temperature. The free end of the bimetallic strip moves away from the passageway to open the passageway to allow movement of the object along the passageway when the temperature of the bimetallic strip reaches the predetermined release temperature. The free end of the bimetallic strip is preferably L-shaped for contacting the object to prevent movement thereof along the passageway. A non-metallic tip formed of plastic, for example, can be provided at the free end of the bimetallic strip for contacting the object. The plastic tip can be press-fitted onto the bimetallic strip.

The passageway for movement of an object to be released is inclined with respect to the horizontal in the disclosed embodiment of the invention so that release of the object from the mechanism upon reaching the predetermined release temperature is facilitated by the force of gravity. If the object to be released is at least round in cross section, a round ball is employed in the illustrated embodiment, it is able to roll under the force of gravity down the inclined passageway past the temperature responsive means when the temperature of the temperature responsive means reaches the predetermined release temperature.

The novelty "brass monkey" incorporating the release mechanism of the invention includes a base which is provided beneath the release mechanism for receiving the object released by the release mechanism. The base is designed to produce an audible sound when struck by the balls released from the release mechanism. The base can also be provided with an electrical switch means which is actuated by the ball received by the base. The electrical switch means can be used to activate other devices.

According to a further feature of the invention means are provided for adjusting the predetermined release temperature of the release mechanism. In a preferred form of the invention, this means for adjusting comprises a support for the object to be released and means for adjusting the location of the support, and hence the object thereon, relative to the temperature responsive means.

These and other objects, features, and advantages of the present invention will become more apparent from the following description when taken in connection with the accompanying drawings which show, for purposes of illustration only, one embodiment in accordance with the invention.

DESCRIPTION OF THE DISCLOSED EMBODIMENT

Figure 1:
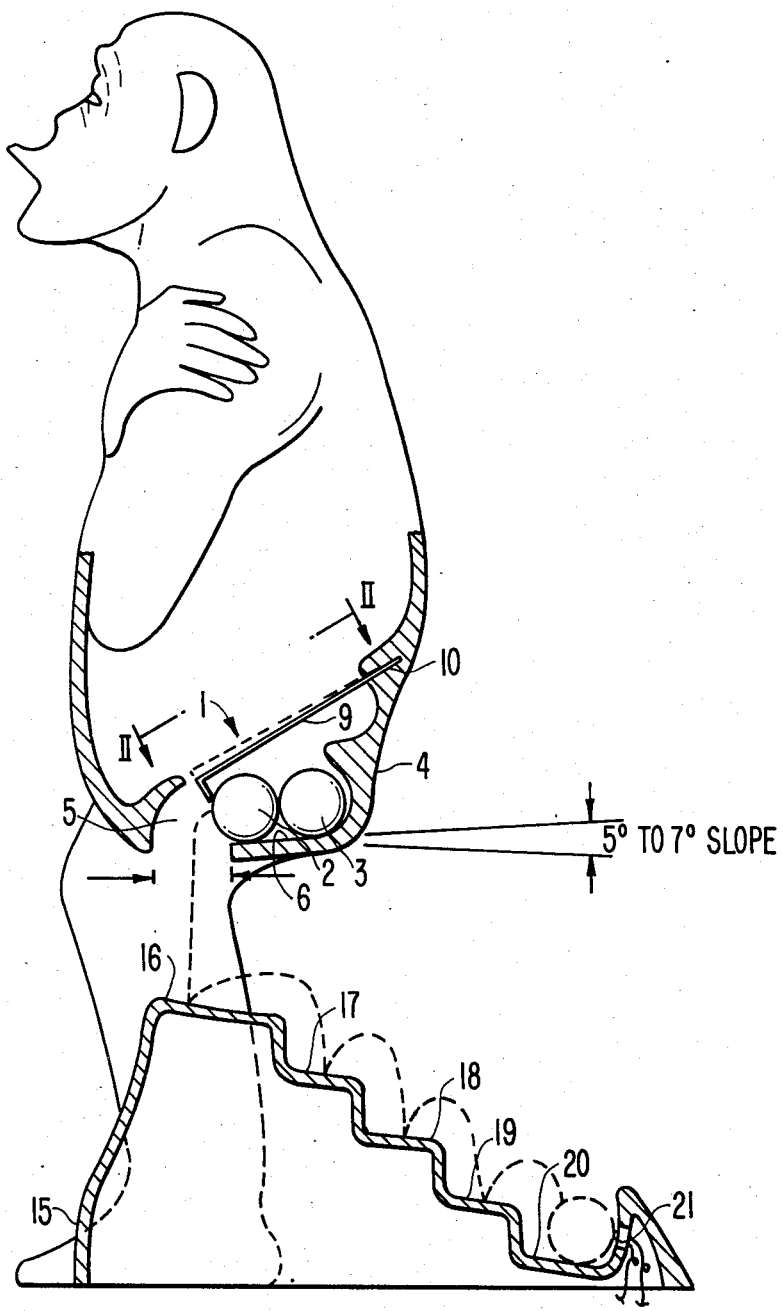
FIG. 1 is a side view of a "brass monkey" of the invention shown partially in cross-section through the body of the monkey and illustrating the release mechanism of the invention and the accompanying base and showing two balls to be released from the body when the temperature of a bimetallic strip of the mechanism reaches a predetermined release temperature.
Figure 2:
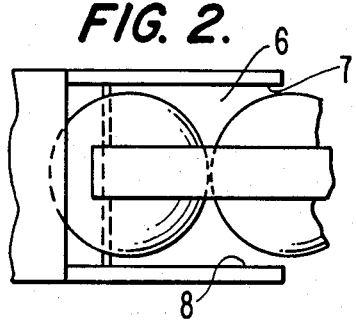
FIG. 2 is a top view of a portion of the release mechanism of the invention of FIG. 1 taken along the line II—II and depicting the bimetallic strip in relation to the two balls to be released from the body of the release mechanism.

Referring now to the drawings, a release mechanism 1 according to the invention is shown incorporated into a novelty "brass monkey" for releasing balls 2 and 3 from a body 4 of the "brass monkey" at a predetermined release temperature through an opening or passageway 5 in the body.

More specifically, the body 4 comprises a support surface 6 and side walls 7 and 8 which define a passageway for movement of the balls 2 and 3 to be released. A temperature responsive means in the form of a bimetallic strip 9 at least partially obstructs the passageway to prevent movement of the object along the passageway 5 before the temperature of the bimetallic strip reaches a predetermined release temperature. The bimetallic strip is fixedly supported at one end in a slot 10 in the body 4 by crimping the portions of the body on either side of the slot 10 against the bimetallic strip or otherwise fastening the strip therein as by soldering, for example. The opposite free end of the bimetallic strip is positioned for movement toward and away from the passageway 5 for at least partially obstructing the passageway to prevent movement of the balls 2 and 3 along the passageway and past the strip 9 before temperature of the bimetallic strip reaches the predetermined release temperature. The bimetallic element 9 is made by welding together two strips of metal having different coefficients of expansion. For example, the two strips of metal may be invar (iron-nickel alloy) and brass. A change in temperature causes the bimetallic element or composite strip to bend an amount proportional to the temperature. Thus, when the temperature drops to a predetermined release temperature, the free end of the bimetallic strip 9 moves upwardly to the position shown in dashed lines in FIGS. 1 and 3 thereby releasing the balls 2 and 3 for movement through the opening or passageway 5 of the body 4.

Figure 3:
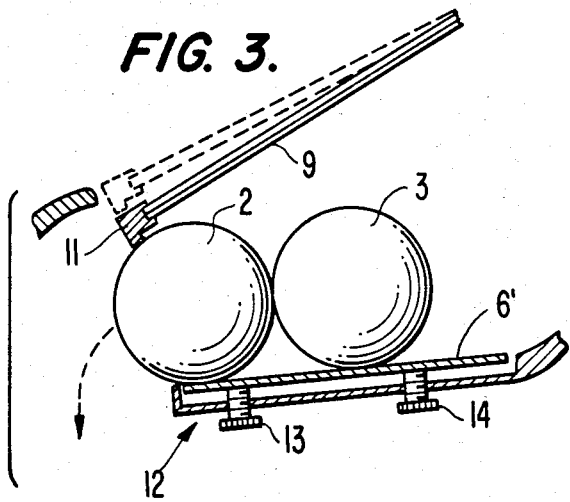
FIG. 3 is an enlarged cross sectional view of a portion of the release mechanism of the invention and illustrating two additional features of the of the invention not shown in FIG. 1 including means for adjusting the predetermined release temperature for releasing the balls from the mechanism and an L-shaped plastic tip press-fitted onto the free end of the bimetallic strip.

Preferably, the free end of the bimetallic strip 9 is L-shaped so that the free end of the strip contacts the adjacent ball to prevent movement thereof along the passageway before the temperature of the bimetallic strip reaches the predetermined release temperature. As shown in FIG. 3 of the drawings, the L-shaped tip 11 of the bimetallic strip 9 may be formed of plastic with the tip 11 being press-fitted onto the bimetallic strip.

The support surface 6 of the body 4 which defines the passageway 5 for movement of the balls to be released is preferably inclined with respect to the horizontal. This inclination is 5° to 7° in the illustrated embodiment. With this arrangement, the force of gravity causes the balls to roll down the support surface 6 and out the opening in the bottom of the body 4 when the bimetallic strip moves away from the passageway at the predetermined release temperature.

A means 12 can be provided in the release mechanism for adjusting the predetermined release temperature as shown in FIG. 3 of the drawings. The means 12 comprises a support 6' for the balls 2 and 3 and means in the form of adjusting screws 13 and 14 for adjusting the location of the support 6' relative to the bimetallic strip. Adjustment of the screws 13 and 14 changes the spacing between the support 6' and the free end of the bimetallic strip 9. Since the amount of bending of the bimetallic strip is proportional to the temperature, changing the relative spacing between the support 6' and the free end of the bimetallic strip necessarily changes the release temperature at which the balls 2 and 3 can roll unobstructed past the free end of the bimetallic strip.

A base 15 of the novelty "brass monkey" is provided beneath the release mechanism to receive the balls released by the mechanism. Both the body 4 of the "brass monkey" and the base 15 are preferably formed of metal with the base 15 having a hollow form so as to produce an audible sound when struck by the balls released from the body 4. The balls 2 and 3 successively drop from the body 4 onto an inclined top step 16 of the base from where they progressively roll and drop through additional steps 17, 18, 19 and 20 formed on the base as shown in FIG. 1. An electrical switch 21 can be provided in the base, for example adjacent the bottom step 20 for actuation by the balls. In particular, the switch 21 is provided with a plunger located in a position where it is contacted and depressed by the ball 2 when the ball is received in the lower step 20 of the base. The electrical switch 21 can, in turn, be used to activate other devices such as a bell tone or chimes, for example. Once the balls have been dropped from the body 4 by the release mechanism, and the temperature has increased above the predetermined release temperature, the balls can be returned to the body 4 by inserting them through the bottom opening 5 in the body in which case the bimetallic strip 9 is pushed upwardly momentarily at its free end for insertion of the balls onto the support surface of the body, or the balls may be inserted in another opening, not shown, provided in the side of the body adjacent the support surface 6.

While I have shown and described only one embodiment in accordance with the present invention, it is understood that the same is not limited thereto, but is susceptible to numerous changes and modifications as known to those skilled in the art. For example, the release mechanism and base of the invention are not limited to use in a novelty "brass monkey" but could be used in other applications for releasing balls and/or a variety of other objects. For example, lightweight cylinders could be permitted to roll down the inclined support surface upon reaching a predetermined release temperature. Further, the bimetallic element in the release mechanism could be in a form other than a strip and also could be oriented so as to release an object with an increase in temperature to a predetermined release temperature instead of with a decrease in temperature to a predetermined release temperature as in the disclosed embodiment of the invention. Therefore, I do not wish to be limited to the details shown and described herein, but intend to cover all such changes and modifications as are encompassed by the scope of the appended claims.

I claim:

1. A release mechanism comprising means defining a passageway for movement of an object to be released and temperature responsive means at least partially obstructing said passageway to prevent movement of said object along said passageway past said temperature responsive means before the temperature of said temperature responsive means reaches a predetermined release temperature and said temperature responsive means moving to open said passageway to allow movement of said object along said passageway past said temperature responsive means when the temperature of said temperature responsive means reaches said predetermined release temperature, wherein said temperature responsive means is a bimetallic element, means being provided for fixedly supporting said bimetallic element at one portion thereof with a second portion of said bimetallic element being positioned for movement toward and away from said passageway for at least partially obstructing said passageway to prevent movement of said object along said passageway before the temperature of said bimetallic-element reaches the predetermined release temperature and for moving away from said passageway to open said passageway to allow movement of said object along said passageway when the temperature of said bimetallic element reaches said predetermined release temperature.

2. A release mechanism according to claim 1, wherein said second portion of said bimetallic element is an L-shaped free end of the bimetallic element.

3. A release mechanism according to claim 2, wherein the L-shaped free end of said bimetallic element includes a non-metallic tip for contacting said object to prevent movement thereof along said passageway.

4. A release mechanism according to claim 3, wherein said non-metallic tip is formed of plastic, said tip being press-fitted to said bimetallic element.

5. A release mechanism according to claim 1, wherein said passageway is inclined with respect to the horizontal.

6. A release mechanism comprising means defining a passageway for movement of an object to be released and temperature responsive means at least partially obstructing said passageway to prevent movement of said object along said passageway past said temperature responsive means before the temperature of said temperature responsive means reaches a predetermined release temperature and said temperature responsive means moving to open said passageway to allow movement of said object along said passageway past said temperature responsive means when the temperature of said temperature responsive means reaches said predetermined release temperature, wherein said passageway is inclined with respect to the horizontal and said object is at least round in cross section so as to be able to roll under the force of gravity down the inclined passageway when the temperature of said temperature responsive means reaches said predetermined release temperature.

7. A release mechanism according to claim 6, wherein said object is a round ball.

8. A release mechanism comprising means defining a passageway for movement of an object to be released and temperature responsive means at least partially obstructing said passageway to prevent movement of said object along said passageway past said temperature responsive means before the temperature of said temperature responsive means reaches a predetermined release temperature and said temperature responsive means moving to open said passageway to allow movement of said object along said passageway past said temperature responsive means when the temperature of said temperature responsive means reaches said predetermined release temperature, wherein a base is provided beneath said release mechanism to receive said object released by said release mechanism and said base is provided with electrical switch means which is actuated by said object when received by said base.

9. A release mechanism comprising a body defining an inclined passageway for movement of an object to be released from said body and a bimetallic strip fixedly secured at one end to said body with the opposite free end of said bimetallic strip at least partially obstructing said passageway to prevent movement of said object along said passageway before the temperature of said bimetallic strip reaches a predetermined release temperature and said free end of said bimetallic strip moving to open said passageway to allow movement of said object along said passageway when the temperature of said bimetallic strip reaches said predetermined release temperature.

10. A release mechanism according to claim 9, wherein the free end of said bimetallic strip includes a non-metallic tip portion for contacting said object to prevent movement of said object along said passageway before the temperature of said bimetallic strip reaches said predetermined release temperature.

11. A release mechanism according to claim 9, wherein said object is a ball which rolls down the inclined passageway in said body and is released from said body when the temperature of said bimetallic strip reaches said predetermined release temperature, a base being provided beneath said release mechanism for receiving said ball when released by said release mechanism.

12. A release mechanism according to claim 11, wherein said base is designed to produce an audible sound when struck by said ball.

13. A release mechanism comprising a bocy having an opening for release of an object contained within said body and temperature responsive means at least partially obstructing said opening to prevent release of said object from said body before the temperature of said temperature responsive means reaches a predetermined release temperature and said temperature responsive means moving to open said opening to allow release of said object from said body when the temperature of said temperature responsive means reaches said predetermined release temperature, wherein said temperature responsive means is a bimetallic element which is fixedly supported at one portion thereof with a second portion of said bimetallic element being position to at least partially obstruct said opening to prevent release of said object before the temperature of said bimetallic element reaches said predetermined release temperature and said second portion of said bimetallic element moving to open said opening and release said object when the temperature of said bimetallic element reaches said predetermined release temperature.

14. A release mechanism according to claim 13, wherein said second portion of said bimetallic element is L-shaped for contacting said object to prevent release of said object before the temperature of said temperature responsive means reaches said predetermined release temperature.

15. A release mechanism according to claim 13, wherein means are provided for adjusting said predetermined release temperature.

16. A release mechanism comprising a body having an opening for release of an object contained within said body and temperature responsive means at least partially obstructing said opening to prevent release of said object from said body before the temperature of said temperature responsive means reaches a predetermined release temperature and said temperature responsive means moving to open said opening to allow release of said object from said body when the temperature of said temperature responsive means reaches said predetermined release temperature, wherein means are provided from adjusting said predetermined release temperature and wherein said means for adjusting said predetermined release temperature comprises a support for said object and means for adjusting the location of said support relative to said temperature responsive means.

17. A release mechanism comprising a body in the form of a nonkey having a passageway for movement and release of at least one ball from said body at a predetermined release temperature, at least one ball located in said passageway in said body, a bimetallic element mounted in said body with a portion of said bimetallic element at least partially obstructing said passageway to prevent movement of said at least one ball past said bimetallic element and release of said ball from said body before the temperature of said bimetallic element reaches a predetermined release temperature and wherein said bimetallic element moves to open said passageway to allow movement of said at least one ball past said bimetallic element thereof from said body when the temperature of said bimetallic element reaches said predetermined release temperature, and a base located beneath said body for receiving the at least one ball released from said body.

18. A temperature change indicating assembly comprising an object to be released when the temperatue reaches a predetermined release temperature, a temperature responsive release mechanism for retaining the object before the temperature reaches the predetermined release temperature and for releasing the object when the temperature reaches said predetermined release temperature, and indicating means providing an indication of the release of said object by said temperature responsive mechanism, wherein said indicating means receives said object when released by said temperature responsive release mechanism and visually displays said object to provide said indication.

19. A temperature change indicating assembly according to claim 18, wherein said indicating means provides an audible sound when said object is released by said temperature responsive release mechanism.

20. A temperature change indicating assembly comprising an object to be released when the temperature reaches a predetermined release temperature, a temperature responsive release mechanism for retaining the object before the temperature reaches the predetermined release temperature and for releasing the object when the temperature reaches said predetermined release temperature, and indicating means providing an indication of the release of said object by said temperature responsive release mechanism, wherein said temperature responsive release mechanism is positioned above said indicating means so that said object drops to said indicating means when released by said temperature responsive release mechanism.

* * * * *